United States Patent
Huang et al.

(10) Patent No.: US 8,790,946 B2
(45) Date of Patent: Jul. 29, 2014

(54) METHODS OF BONDING CAPS FOR MEMS DEVICES

(75) Inventors: Xin-Hua Huang, Xihu Township (TW); Ping-Yin Liu, Yonghe (TW); Li-Cheng Chu, Taipei (TW); Yuan-Chih Hsieh, Hsin-Chu (TW); Lan-Lin Chao, Sindian (TW); Chun-Wen Cheng, Zhubei (TW); Chia-Shiung Tsai, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/365,043

(22) Filed: Feb. 2, 2012

(65) Prior Publication Data

US 2013/0203199 A1      Aug. 8, 2013

(51) Int. Cl.
  *H01L 21/52*      (2006.01)
(52) U.S. Cl.
  USPC ............. 438/51; 228/199; 228/228; 228/227
(58) Field of Classification Search
  USPC ............................ 438/51; 228/227, 228, 199
  See application file for complete search history.

(56) References Cited

U.S. PATENT DOCUMENTS 4,534,820 A *   8/1985   Mori et al. ..................... 117/58
6,909,589 B2    6/2005   Huff 2010/0258884 A1*  10/2010  Gonska et al. ............... 257/415
2011/0233621 A1*   9/2011  Liu et al. ..................... 257/254
2012/0148870 A1*   6/2012  Liu et al. ..................... 428/641

FOREIGN PATENT DOCUMENTS

JP       2011500343        1/2011
JP       2011529798       12/2011

OTHER PUBLICATIONS

Crnogorac, F., "Aluminum-Germanium Eutectic Bonding for 3D Integration," 2009, IEEE, pp. 1-5.
Nikanorov, S.P., et al., "Elastic and microplastic properties of Al-Si/Ge alloys obtained from leviated melts," Materials Science and Engineering A, 2006, pp. 449-453.

* cited by examiner

*Primary Examiner* — Zandra Smith
*Assistant Examiner* — Damian A Hillman
(74) *Attorney, Agent, or Firm* — Slater and Matsil, L.L.P.

(57) ABSTRACT

A method includes bonding a first bond layer to a second bond layer through eutectic bonding. The step of bonding includes heating the first bond layer and the second bond layer to a temperature higher than a eutectic temperature of the first bond layer and the second bond layer, and performing a pumping cycle. The pumping cycle includes applying a first force to press the first bond layer and the second bond layer against each other. After the step of applying the first force, a second force lower than the first force is applied to press the first bond layer and the second bond layer against each other. After the step of applying the second force, a third force higher than the second force is applied to press the first bond layer and the second bond layer against each other.

20 Claims, 4 Drawing Sheets

METHODS OF BONDING CAPS FOR MEMS DEVICES

BACKGROUND

Micro-Electro-Mechanical System (MEMS) devices may be used in various applications such as micro-phones, accelerometers, inkjet printers, etc. A commonly used type of MEMS devices includes a MEMS capacitor that has a movable element as a capacitor plate, and a fixed element as the other capacitor plate. The movement of the movable element causes the change in the capacitance of the capacitor. The change in the capacitance may be converted into the change in an electrical signal, and hence the MEMS device may be used as a micro-phone, an accelerometer, or the like. The movement of the movable element may also be used in an inkjet printer for squeezing the ink.

MEMS devices typically require caps capping the MEMS devices for protection purpose. The bonding may be performed through eutectic bonding. The bonded surfaces, however, may have oxide layers that adversely affect the reliability of the bonding, and the oxide layers need to be removed before bonding.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments of the disclosure are discussed in detail below. It should be appreciated, however, that the embodiments provide many applicable inventive concepts that can be embodied in a wide variety of specific contexts. The specific embodiments discussed are illustrative, and do not limit the scope of the disclosure.

Methods for forming and capping Micro-Electro-Mechanical System (MEMS) devices are provided in accordance with various embodiments. The intermediate stages of forming and capping the MEMS device are illustrated. The variations of the embodiments are discussed. Throughout the various views and illustrative embodiments, like reference numbers are used to designate like elements.

Figure 1:
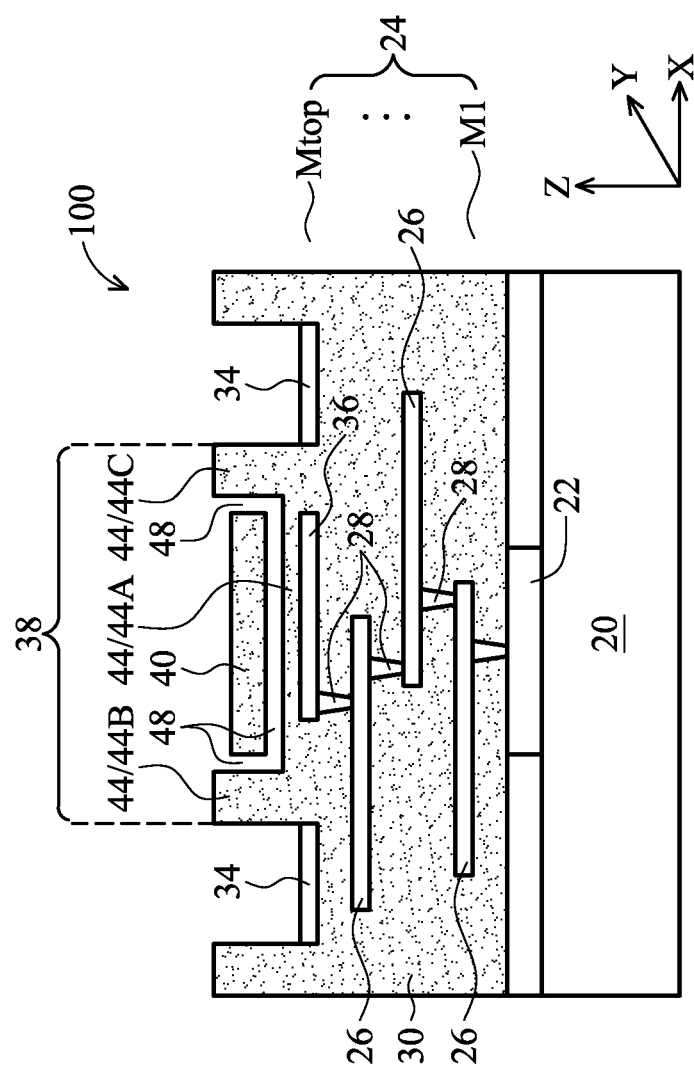
FIGS. 1 through 3 are cross-sectional views of intermediate stages in the manufacturing and the capping of a Micro-Electro-Mechanical System (MEMS) device in accordance with some exemplary embodiments.
Figure 2:
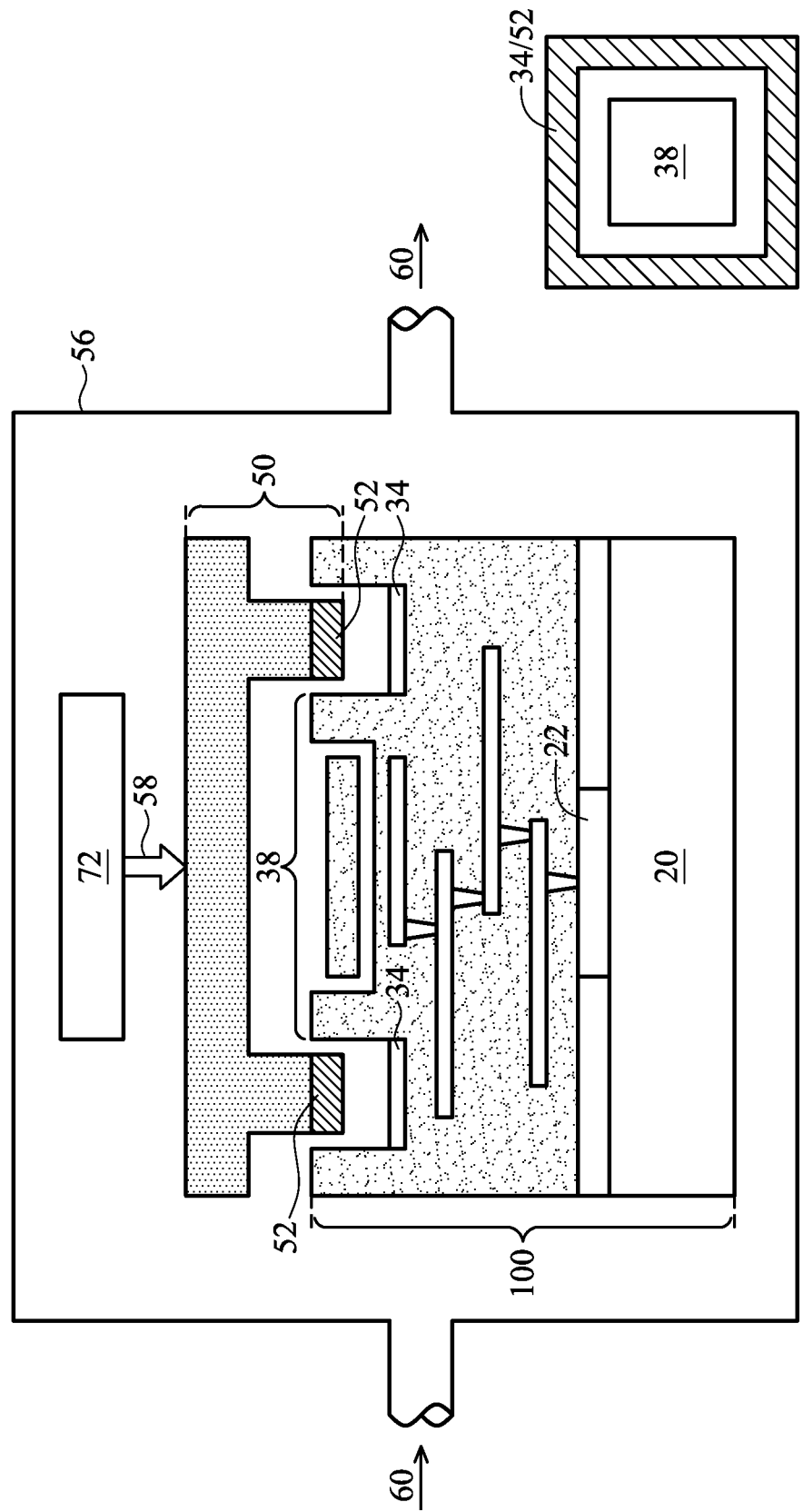
Figure 3:
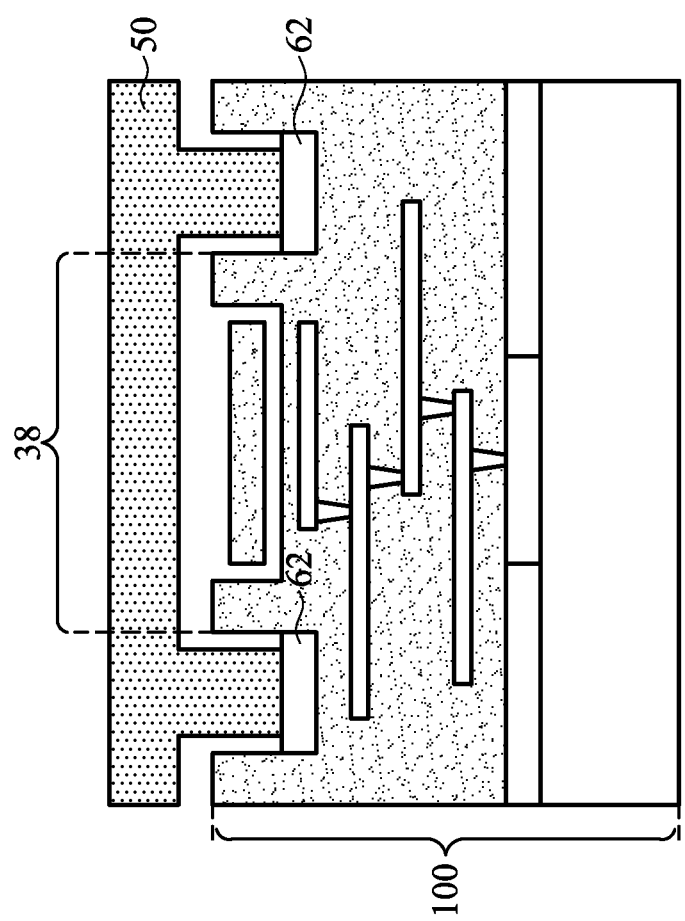

FIGS. 1 through 3 illustrate cross-sectional views of intermediate stages in the formation and the capping of a MEMS device in accordance with some exemplary embodiments. Referring to FIG. 1, device 100 is formed. Device 100 may be a chip or a wafer, which includes MEMS device 38 formed over substrate 20. In some embodiments, substrate 20 is a semiconductor substrate such as a silicon substrate. In alternative embodiments, other semiconductor materials such as silicon germanium, silicon carbon, III-V compound materials, and the like, may be used in substrate 20.

In some embodiments, active devices 22 such as Complementary Metal-Oxide-Semiconductor (CMOS) devices are formed on a surface of semiconductor substrate 20. In alternative embodiments, no active devices are formed at the surface of substrate 20. Metal layers 24, which include metal lines 26 and vias 28 formed in dielectric layers 30, are formed over substrate 20 and active devices 22. Active devices 22 are electrically coupled to metal lines 26 and vias 28 in metal layers 24. Metal layers 24 include bottom metal layer M1 through top metal layer Mtop, wherein the symbol "top" represents the total number of the metal layers, which may be 3, 4, 5, or the like. In some embodiments, metal layers M1 through Mtop are formed of copper or copper alloy using damascene processes.

FIG. 1 further illustrates the formation of bond layer 34, which may be formed, for example, using Physical Vapor Deposition (PVD) and lithography. In some embodiments, bond layer 34 is an aluminum layer. Other materials may be added into bond layer 34. For example, bond layer 34 may include about 0.5 percent copper and about 99.5 percent aluminum. In alternative embodiments, bond layer 34 includes about 97.5 percent aluminum, about 2 percent silicon, and about 0.5 percent copper. In yet other embodiments, bond layer 34 may be a substantially pure germanium layer, indium layer, gold layer, or tin layer. Bond layer 34 may be a single layer, or may be composition layer including two or more layers that are selected from germanium layer, an indium layer, a gold layer, and a tin layer. The layers in the composite layer may be repeated. For example, bond ring 34 may include the stacked layers of Ge/Al, which may be repeated to form Ge/Al/Ge/Al/Ge layers. The materials of bond layer 34 are capable of forming a eutectic alloy with the material of bond layer 52 (not shown in FIG. 1, please refer to FIG. 2). Accordingly, the material of bond layer 34 and the material of bond layer 52 are selected correspondingly. For example, in the embodiments wherein bond layer 34 includes aluminum, the material of bond layer 52 may be selected from germanium, indium, gold, combinations thereof, or multi-layers thereof. Alternatively, in the embodiments wherein metal bond layer 34 includes tin, bond layer 52 may include gold. The thickness of bond layer 34 may be less than about 500 Å to ensure a reliable eutectic bonding (as shown in FIGS. 2 and 3), and at the same time no squeezing of the molten eutectic metal occurs during the eutectic bonding. In some embodiments, there exist other metal features 36 at the same level as bond layer 34, wherein metal features 36 are used for interconnection purpose. Metal features 36 and bond layer 34 may be formed of the same material, and formed simultaneously.

Also referring to FIG. 1, MEMS device 38 is formed in the region encircled by bond layer 34. MEMS device 38 may comprise one or a plurality of capacitors, although it may be another kind of MEMS device other than a capacitor. In an exemplary embodiment in which a capacitor(s) is included, MEMS device 38 includes movable element 40 and fixed elements 44 (denoted as 44A, 44B, and 44C). Movable element 40 is also sometimes referred to as a proof mass. In some embodiments, movable element 40 and fixed elements 44 are formed of a silicon-containing material(s) such as polysilicon, amorphous silicon, or crystalline silicon. The silicon-containing material may be doped with a p-type or an n-type impurity to increase the conductivity.

In some embodiments, movable element 40 and fixed elements 44 of MEMS device 38 may be grown from metal layers 24 and the overlying structures, if any. In alternative embodiments, MEMS device 38 may be pre-formed on another wafer, and then bonded to metal layers 24. Fixed elements 44 may include portion 44A, which is under movable element 40 and forming a capacitor with movable element 40. Movable element 40 and fixed elements 44 form capacitor plates of the capacitor(s), while air-gaps 48 between movable element 40 and fixed elements 44 form the capacitor insulators. Furthermore, movable element 40 and other fixed elements such as 44B and/or 44C may form additional capacitors, with air-gaps 48 therebetween forming the capacitor insulators. Although not illustrated, movable element 40 may be anchored and supported by springs (not shown), which may be formed of the same material as that of movable element 40 and/or fixed elements 44. The springs are not in the same plane as illustrated, and hence are not illustrated herein. The springs allow movable element 40 to move freely in air-gaps 48, so that the capacitance of the capacitors formed between movable element 40 and fixed elements 44 may be changed. The capacitor formed between elements 40 and 44A may be used for reflecting the Z-direction movement of movable element 40, while the capacitor(s) formed between elements 40 and 44B and 44C may be used for reflecting the movement of movable element 40 in the X and Y directions.

FIG. 2A illustrates the bonding of cap 50 onto the structure shown in FIG. 1. In some embodiments, a main portion (for example, the portion other than bond layer 52) of cap 50 is formed of a semiconductor material such as silicon, a metal, or a dielectric material. Cap 50 includes a portion over MEMS device 38, with an air-gap between cap 50 and MEMS device 38 after the bonding. Bond layer 52 is formed as a bottom surface portion of cap 50, and is bonded to bond layer 34 through a eutectic bonding step. In some embodiments, cap 50 may include additional MEMS devices (not shown), CMOS devices (not shown), or the like. Bond layer 52 is formed of a material that forms a eutectic alloy with bond layer 34. Accordingly, bond layer 52 may comprises a pure germanium layer, an indium layer, a gold layer, or a tin layer. Alternatively, bond layer 52 may be a composition layer having a plurality of stacked layers including two or more of a germanium layer, an indium layer, a gold layer, and a tin layer. Bond layer 52 may also include aluminum. Germanium and/or gold may form eutectic alloy with aluminum, and gold may formed eutectic alloy with tin. Accordingly, the materials of bond layer 34 and bond layer 52 are selected correspondingly, so that after a eutectic bonding, bond layer 34 and bond layer 52 form a eutectic alloy.

Referring to FIG. 2B, in a top view or a bottom view, bond layer 52 may have a shape of a ring that has a size and a shape matching the top-view size and the shape, respectively, of bond layer 34. The rings of bond layers 34 and 52 may be fully enclosed rings with no break therein. The rings of bond layers 34 and 52 encircle MEMS device 38. Alternatively, bond layer 34 may form a near-ring structure substantially encircling MEMS device 38. Throughout the description, bond layers 34 and 52 are alternatively referred to as bond rings 34 and 52, respectively.

Referring back to FIG. 2A, the bonding of cap 50 to bond ring 34 may be performed in chamber 56. Before the bonding process, forming gas 60 may be pumped in, and purged from, chamber 56, in a plurality of pump-purge cycles. Forming gas 60 may include a reduction gas such as hydrogen ($H_2$) or an acid such as oxalic acid or acetic acid. In addition, carrier gases such as nitrogen ($N_2$) may be added into the forming gases. Accordingly, the oxide, if any, of bond ring 34 and/or bond ring 52 will be removed before the bonding process. After the pump-purge cycles, the pressure in chamber 68 may be maintained at a relatively stable level, and a eutectic bonding is started. During the eutectic bonding, actuator 72 of a bonder applies a force (symbolized by arrow 58) pushing cap 50 against device 100. Actuator 72 is configured to apply desirable forces. In some embodiments, actuator 72 is a pneumatic actuator or a servomotor, which applies the force through the controlling of air-pressure or electricity. Alternatively, actuator 72 is a hydraulic actuator.

Figure 4:
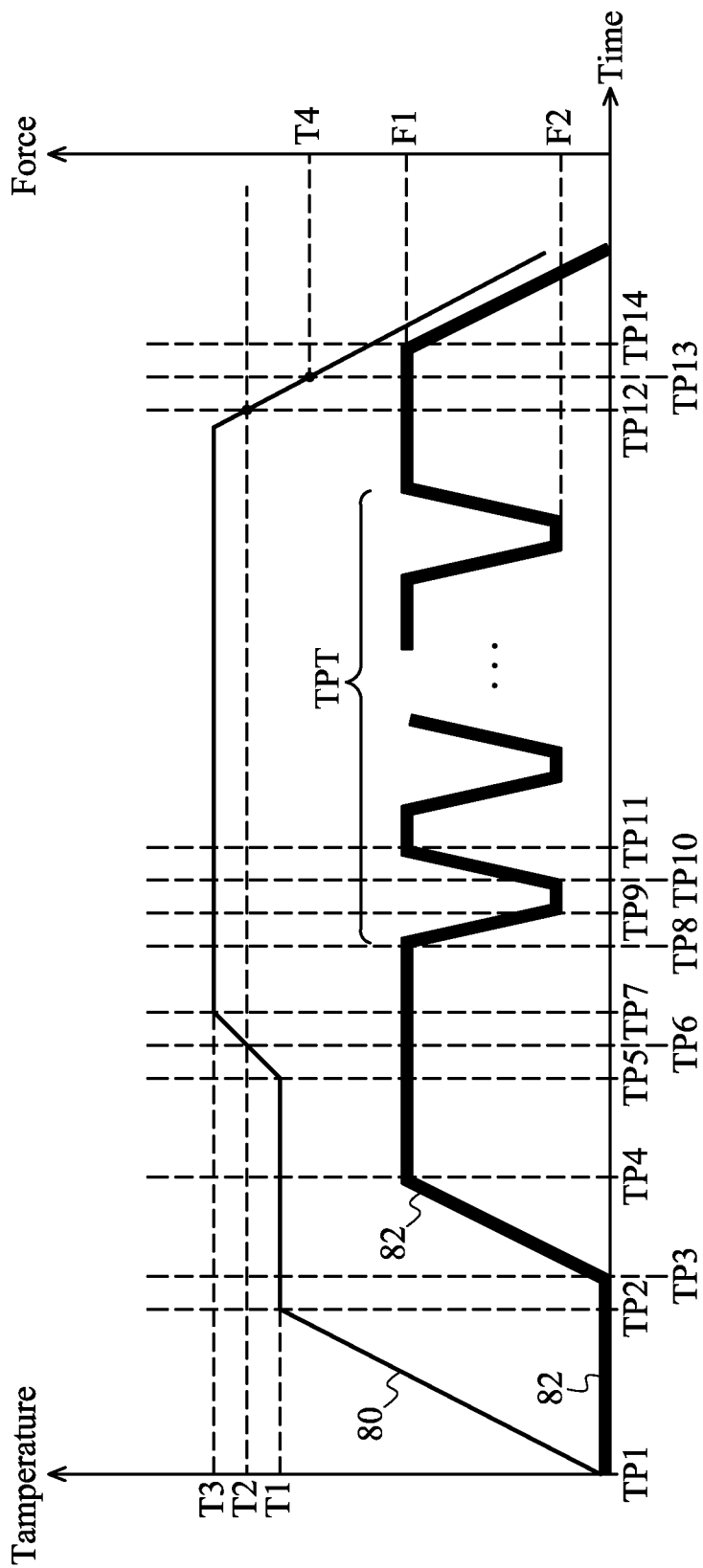
FIG. 4 illustrates the profiles of temperatures and forces used in the bonding of a cap to a MEMS device in accordance with some exemplary embodiments.

During the bonding, both devices 100 and 50 are heated, and force 58 is applied by actuator 72 to press cap 50 and device 100 against each other when the temperature of device 100 is elevated. FIG. 4 schematically illustrates the temperatures (the left Y axis, corresponding to line 80) of device 100 and cap 50, wherein the temperatures are illustrated as a function of time. FIG. 4 also illustrates the force (the right Y axis, corresponding to line 82) applied by actuator 72 to device 100 and cap 50, wherein the force is illustrated as a function of time. In some exemplary bonding processes, as shown in FIG. 4, between time points TP1 and TP2, substantially no force (please refer to line 82) is applied. Device 100 and cap 50 are heated to temperature T1 (please refer to line 80), which is a temperature close to, and lower than, eutectic temperature T2. Eutectic temperature T2 is the temperature that bond ring 34 (FIG. 2) may form a eutectic alloy with bond ring 52. In some exemplary embodiments, temperature T1 is between about 30° C. and about 415° C. It is appreciated that the range of eutectic temperature T2 depends on the materials of bond ring 34 and bond ring 52, and may vary in response to various factors.

When the temperatures of device 100 and cap 50 are stabled at temperature T1, actuator 72 applies a force (refer to line 82) on device 100 and cap 50 between time points TP3 and TP4. The time duration between time points TP3 and TP4 may be as short as possible (depending on the capability of actuator 72), so that the force may quickly rise to a force level indicated as F1. In some embodiments, device 100 and cap 50 are wafers. Accordingly, force F1 may be between about 30 KN (kilonewtons) and about 60 KN in some embodiments. Force F1 is adequate to result in the eutectic reaction between bond ring 34 and bond ring 52. The optimum force F1 is related to the size of device 100 and cap 50, and the materials of bond ring 34 and bond ring 52.

When force F1 is applied, and between time points TP5 and TP7, the temperatures of device 100 and cap 50 are increased to temperature T3, which is higher than eutectic temperature T2. In some exemplary embodiments, temperature T3 is between about 430° C. and about 460° C. The time point the eutectic temperature T2 is reached is indicated as time point TP6.

Next, when the temperatures of device 100 and cap 50 are at temperature T3, which is higher than eutectic temperature T2, the force applied to device 100 and cap 50 is reduced to force F2 during the period of time between time points TP8 and TP9. Force F2 may be a non-zero force. In some embodiments, force F2 is smaller than about 70 percent, or smaller than about 40 percent, force F1. Force F2 may also be between about 20 percent and about 40 percent force F1.

During the time duration between time points TP9 and TP10, the force applied to device 100 and cap 50 is maintained at force F2. The force is then increased, for example, back to force F1 in a period of time between time points TP10 and TP11. It is noted that although FIG. 4 illustrates that the force at time TP11 is increased back to the same magnitude as the force F1 at time points TP8, the forces may be slightly different from each other. Throughout the description, the reduction of the force from F1 to F2 and the increase of the force from F2 back to F1 are in combination referred to as one pumping cycle. During the pumping cycle, since the force increases from a low level F2 to a high level F1, the corresponding force is referred to as a pumping force.

In some embodiments, the force is applied with a plurality of pumping cycles. The number of pumping cycles may also range from one cycle to any number of cycles, for example, about five cycles or more. During the bonding process, bond ring 34 and bond ring 52 go through the eutectic reaction, and are liquefied to form eutectic alloy 62 (FIG. 3). Next, after the pumping cycles are finished, the temperatures of device 100 and cap 50 are reduced. At time point TP12 (FIG. 4), the temperatures of device 100 and cap 50 are reduced to lower than eutectic temperature T2. At time point TP13, which correspond to temperature T4, alloy 62 as in FIG. 3 solidifies. The applied force is then reduced at time point TP14, and continues to be reduced, until the force is no longer applied. The bonding process is thus finished. The resulting structure, in which cap 50 is bonded to device 100 through alloy 62, is illustrated in FIG. 3.

Referring back to FIG. 4, the duration (TP12-TP6) between time points TP6 and TP12 is referred to as the total dwell time of the bonding process. The duration between time points TP6 and time points TP8 may be between about 10 percent and about 15 percent the total dwell time. The total pumping time duration TPT, during which the pumping cycles are performed, may be between about 60 percent and about 90 percent of the total dwell time in some exemplary embodiments.

In the embodiments, the pumping force may help the oxide formed on the top surface of bond ring 34 and/or bond ring 52 to be penetrated through. Accordingly, the elements that are to form the eutectic alloy may reliably contact each other. The resulting bonding is thus more reliable. Experiment results indicated the much more dendrite structures are formed in the eutectic alloy 62 (FIG. 3) when the bonding methods in accordance with embodiments are adopted. This indicates the more reliable bonding. Furthermore, in the experiments performed on some bonding samples, the bonding yield resulted from the embodiments (wherein the pumping cycles are performed) is more than doubled over the bonding yield of the bonding process performed using the pneumatic actuator and without the pumping cycles.

In accordance with embodiments, a method includes bonding a first bond layer to a second bond layer through eutectic bonding. The step of bonding includes heating the first bond layer and the second bond layer to a temperature higher than a eutectic temperature of the first bond layer and the second bond layer, and performing a pumping cycle. The pumping cycle includes applying a first force to press the first bond layer and the second bond layer against each other. After the step of applying the first force, a second force lower than the first force is applied to press the first bond layer and the second bond layer against each other. After the step of applying the second force, a third force higher than the second force is applied to press the first bond layer and the second bond layer against each other.

In accordance with other embodiments, a method includes forming a MEMS device over a substrate. The step of forming the MEMS device includes forming a movable element as a first capacitor plate of a capacitor, forming a fixed element as a second capacitor plate of the capacitor, forming a first bond ring to encircle the MEMS device, and bonding a cap to cover the MEMS device. A second bond ring on the cap reacts with the first bond ring in a eutectic reaction. The step of bonding includes applying a first force to press the first bond layer and the second bond layer against each other. After the step of applying the first force, a second force lower than the first force is applied to press the first bond layer and the second bond layer against each other. After the step of applying the second force, a third force higher than the second force is applied to press the first bond layer and the second bond layer against each other.

In accordance with yet other embodiments, a method includes forming a first bond layer to substantially encircle a MEMS device, heating the first bond layer, and pressing a cap against the first bond layer with a varying force. The varying force varies between a high force and a low force for a plurality of cycles. A second bond layer of the cap is pressed against the first bond layer by the varying force.

Although the embodiments and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A method comprising:
   bonding a first bond layer to a second bond layer through eutectic bonding, wherein the step of bonding comprises:
   heating the first bond layer and the second bond layer to a temperature higher than a eutectic temperature of the first bond layer and the second bond layer; and
   performing a first pumping cycle comprising:
   applying a first force to press the first bond layer and the second bond layer against each other;
   after the step of applying the first force, applying a second force lower than the first force to press the first bond layer and the second bond layer against each other; and
   after the step of applying the second force, applying a third force higher than the second force to press the first bond layer and the second bond layer against each other.

2. The method of claim 1 further comprising, when the first bond layer and the second bond layer are at temperatures higher than the eutectic temperature, applying a second pumping cycle to press the first bond layer and the second bond layer against each other.

3. The method of claim 2, wherein the step of bonding the first bond layer to the second bond layer comprises more than about five pumping cycles.

4. The method of claim 1, wherein the first bond layer is comprised in a device comprising a Micro-Electro-Mechanical System (MEMS) device, and wherein the second layer is comprised in a cap configured to cap the MEMS device.

5. The method of claim 1, wherein the second force is lower than about 40percent of the first force.

6. The method of claim 1, wherein the step of bonding the first bond layer to the second bond layer has a total dwell time, wherein the total dwell time is measured between a first time point and a second time point, with the first time point being when the first bond layer and the second bond layer reach the eutectic temperature, and the second time point being when temperatures of the first bond layer and the second bond layer are reduced to lower than the eutectic temperature, and wherein before the first pumping cycle is applied, the first force is applied to the first and the second bond layers for a duration between about 10 percent and about 15 percent of the total dwell time.

7. The method of claim 6, wherein the step of bonding the first bond layer to the second bond layer comprises a plurality of pumping cycles, and wherein a total time duration of the plurality of pumping cycles is between about 60 percent and about 90 percent of the total dwell time.

8. A method comprising:
forming a Micro-Electro-Mechanical System (MEMS) device over a substrate, wherein the step of forming the MEMS device comprises:
forming a movable element as a first capacitor plate of a capacitor; and
forming a fixed element as a second capacitor plate of the capacitor;
forming a first bond ring to encircle the MEMS device; and
bonding a cap to cover the MEMS device, wherein a second bond ring on the cap reacts with the first bond ring in a eutectic reaction, and wherein the step of bonding comprises performing a pumping cycle comprising:
applying a first force to press the first bond ring and the second bond ring against each other;
after the step of applying the first force, applying a second force lower than the first force to press the first bond ring and the second bond ring against each other; and
after the step of applying the second force, applying a third force higher than the second force to press the first bond ring and the second bond ring against each other.

9. The method of claim 8, wherein during an entirety of the pumping cycle, the first bond ring and the second bond ring are at temperatures higher than a eutectic temperature of the first bond ring and the second bond ring.

10. The method of claim 8, wherein the step of bonding the cap comprises a plurality of pumping cycles for pressing the first bond ring and the second bond ring against each other, and wherein throughout the plurality of pumping cycles, the first bond ring and the second bond ring are at temperatures higher than a eutectic temperature of the first bond ring and the second bond ring.

11. The method of claim 8, wherein the first bond ring and the second bonding ring comprise materials selected from the group consisting essentially of aluminum, germanium, gold, tin, and combinations thereof.

12. The method of claim 8, wherein the second force is lower than about 40 percent of the first force.

13. The method of claim 8, wherein the second force is a non-zero force.

14. The method of claim 8 further comprising, after the pumping cycle, lowering temperatures of an alloy generated from the first bond ring and the second bond ring to below a eutectic temperature of the first bond ring and the second bond ring.

15. A method comprising:
forming a first bond layer to substantially encircle a MEMS device;
heating the first bond layer; and
pressing a cap against the first bond layer with a varying force, wherein a second bond layer of the cap is pressed against the first bond layer, and wherein the varying force varies between a high force and a low force for a plurality of cycles.

16. The method of claim 15, wherein the second bond layer on the cap reacts with the first bond layer in a eutectic reaction during the step of pressing, and wherein after the step of heating the first bond layer, the first bond layer is at a temperature higher than a eutectic temperature of the first bond layer and the second bond layer.

17. The method of claim 16, wherein the step of applying the varying force comprises:
applying the high force in a duration starting from a time point before the first bond layer rises to the eutectic temperature and ending at a time point after the first bond layer rises to the eutectic temperature; and
applying the low force after the step of applying the high force, wherein when the low force is applied, the first bond layer is at a temperature higher than the eutectic temperature.

18. The method of claim 17 further comprising applying the high force, and at a same time reducing temperatures of the first bond layer and the second bond layer to lower than the eutectic temperature.

19. The method of claim 15, wherein the low force is lower than about 40 percent the high force.

20. The method of claim 19, wherein the low force is a non-zero force.

* * * * *